United States Patent
Takahashi

(10) Patent No.: US 11,936,047 B2
(45) Date of Patent: Mar. 19, 2024

(54) BINDER COMPOSITION FOR ELECTROCHEMICAL DEVICE, CONDUCTIVE MATERIAL DISPERSION LIQUID FOR ELECTROCHEMICAL DEVICE, SLURRY COMPOSITION FOR ELECTROCHEMICAL DEVICE ELECTRODE, ELECTRODE FOR ELECTROCHEMICAL DEVICE, AND ELECTROCHEMICAL DEVICE

(71) Applicant: ZEON CORPORATION, Tokyo (JP)

(72) Inventor: Naoki Takahashi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 18/005,670

(22) PCT Filed: Aug. 2, 2021

(86) PCT No.: PCT/JP2021/028674
§ 371 (c)(1),
(2) Date: Jan. 17, 2023

(87) PCT Pub. No.: WO2022/044716
PCT Pub. Date: Mar. 3, 2022

(65) Prior Publication Data
US 2023/0317949 A1 Oct. 5, 2023

(30) Foreign Application Priority Data
Aug. 31, 2020 (JP) ................. 2020-146305

(51) Int. Cl.
*H01M 4/62* (2006.01)
*C08F 236/12* (2006.01)
*C08K 3/30* (2006.01)
*H01M 4/133* (2010.01)

(52) U.S. Cl.
CPC .......... *H01M 4/622* (2013.01); *C08F 236/12* (2013.01); *C08K 3/30* (2013.01); *H01M 4/133* (2013.01); *H01M 4/625* (2013.01); *C08F 2810/00* (2013.01); *C08K 2003/3081* (2013.01)

(58) Field of Classification Search
CPC ...... H01M 4/622; H01M 4/133; H01M 4/625; C08F 236/12; C08F 2810/00; C08K 3/30; C08K 2003/3081
See application file for complete search history.

(56) References Cited

U.S. PATENT DOCUMENTS

2010/0324226 A1* 12/2010 Hosotani ............... C08F 236/12
525/338
2020/0127291 A1* 4/2020 Otsuka .................. C08F 236/12
2022/0336815 A1* 10/2022 Oshima ................. H01M 4/622

FOREIGN PATENT DOCUMENTS

| CN | 110383547 A | 10/2019 | |
|---|---|---|---|
| JP | 2014011002 A | 1/2014 | |
| JP | 2018160421 A | 10/2018 | |
| WO | WO-2018173975 A1 * | 9/2018 | ............ C08C 19/02 |
| WO | WO-2023182119 A1 * | 9/2023 | |

OTHER PUBLICATIONS

English Translation of WO2023182119 (Year: 2023).*
Feb. 28, 2023, International Preliminary Report on Patentability issued in the International Patent Application No. PCT/JP2021/028674.
Jul. 6, 2021, Decision to Grant a Patent issued by the Japan Patent Office in the corresponding Japanese Patent Application No. 2020-146305.
Mar. 16, 2021, Notification of Reasons for Refusal issued by the Japan Patent Office in the corresponding Japanese Patent Application No. 2020-146305.
Sep. 12, 2023, the Supplementary European Search Report issued by the European Patent Office in the corresponding European Patent Application No. 21861144.0.
Sep. 25, 2023, Communication pursuant to Article 94(3) EPC issued by the European Patent Office in the corresponding European Patent Application No. 21861144.0.

* cited by examiner

*Primary Examiner* — Andrew J. Oyer
(74) *Attorney, Agent, or Firm* — KENJA IP LAW PC

(57) ABSTRACT

Provided is a binder composition for an electrochemical device that can stably disperse a conductive carbon material and that can cause an electrochemical device to display excellent output characteristics and high-voltage cycle characteristics. The binder composition for an electrochemical device contains a polymer including a nitrile group-containing monomer unit and an alkylene structural unit and a group 13 element and satisfies a relationship formula: $0.1 \leq M/I \leq 150$ (in the formula, I is the iodine value [g/100 g] of the polymer and M is the concentration [ppm] of the group 13 element).

7 Claims, No Drawings

BINDER COMPOSITION FOR ELECTROCHEMICAL DEVICE, CONDUCTIVE MATERIAL DISPERSION LIQUID FOR ELECTROCHEMICAL DEVICE, SLURRY COMPOSITION FOR ELECTROCHEMICAL DEVICE ELECTRODE, ELECTRODE FOR ELECTROCHEMICAL DEVICE, AND ELECTROCHEMICAL DEVICE

TECHNICAL FIELD

The present disclosure relates to a binder composition for an electrochemical device, a conductive material dispersion liquid for an electrochemical device, a slurry composition for an electrochemical device electrode, an electrode for an electrochemical device, and an electrochemical device.

BACKGROUND

Electrochemical devices such as non-aqueous secondary batteries (for example, lithium ion secondary batteries) have characteristics such as compact size, light weight, high energy density, and the ability to be repeatedly charged and discharged, and are used in a wide variety of applications. Consequently, in recent years, studies have been made to improve battery members such as electrodes with the aim of achieving even higher electrochemical device performance.

An electrode of an electrochemical device such as a lithium ion secondary battery, for example, generally includes a current collector and an electrode mixed material layer (positive electrode mixed material layer or negative electrode mixed material layer) formed on the current collector. The electrode mixed material layer is formed, for example, through application and drying on the current collector of a slurry composition that contains an electrode active material, a carbon material (conductive carbon material) as a conductive material, and a polymer responsible for acting as a binder, dispersed in a solvent.

Attempts have been made to improve slurry compositions used in the formation of electrode mixed material layers in recent years with the aim of achieving further improvement of electrochemical device performance.

As one specific example, Patent Literature (PTL) 1 discloses a binder composition that contains a polymer including an alkylene structural unit and a nitrile group-containing monomer unit and an organic solvent and that has a solution turbidity of not less than 1 and not more than 80 and a concentration of metal ions selected from the group consisting of aluminum ions, calcium ions, and magnesium ions of not less than 50 mass ppm and not more than 4,000 mass ppm. In PTL 1, the stability of a slurry composition, the peel strength of an electrode mixed material layer, and the output characteristics of a secondary battery are improved by using this binder composition.

CITATION LIST

Patent Literature

PTL 1: JP2018-160421A

SUMMARY

Technical Problem

However, there is room for improvement of the conventional binder composition described above in terms of further increasing dispersion stability of a conductive carbon material and improving output characteristics and high-voltage cycle characteristics of an electrochemical device.

Accordingly, one object of the present disclosure is to provide a binder composition for an electrochemical device that can stably disperse a conductive carbon material and that can cause an electrochemical device to display excellent output characteristics and high-voltage cycle characteristics.

Another object of the present disclosure is to provide a conductive material dispersion liquid for an electrochemical device and a slurry composition for an electrochemical device electrode that have excellent dispersion stability of a conductive carbon material and that can cause an electrochemical device to display excellent output characteristics and high-voltage cycle characteristics.

Yet another object of the present disclosure is to provide an electrode for an electrochemical device that can cause an electrochemical device to display excellent output characteristics and high-voltage cycle characteristics and an electrochemical device that has excellent output characteristics and high-voltage cycle characteristics.

Solution to Problem

The inventor conducted diligent investigation with the aim of solving the problems set forth above. The inventor discovered that in the case of a binder composition for an electrochemical device that contains a polymer including a nitrile group-containing monomer unit and an alkylene structural unit and that also contains a group 13 element, by causing the iodine value of the polymer and the concentration of the group 13 element to satisfy a specific relationship, it is possible to stably disperse a conductive carbon material in a conductive material dispersion liquid or slurry composition that is produced using the binder composition and to cause an electrochemical device that includes an electrode produced using the binder composition to display excellent output characteristics and high-voltage cycle characteristics. In this manner, the inventor completed the present disclosure.

Specifically, the present disclosure aims to advantageously solve the problems set forth above, and a presently disclosed binder composition for an electrochemical device comprises: a polymer including a nitrile group-containing monomer unit and an alkylene structural unit; and a group 13 element, wherein, when an iodine value of the polymer is taken to be I, in units of g/100 g, and concentration of the group 13 element is taken to be M, in units of ppm, a relationship formula $0.1 \leq M/I \leq 150$ is satisfied. Through inclusion of a polymer that includes a nitrile group-containing monomer unit and an alkylene structural unit in this manner, it is possible to stably disperse a conductive carbon material. Moreover, through the iodine value of the polymer and the concentration of the group 13 element satisfying a specific relationship, it is possible to increase dispersion stability of a conductive carbon material while also causing an electrochemical device to display excellent output characteristics and high-voltage cycle characteristics.

Note that the "iodine value of the polymer" referred to in the present disclosure can be measured in accordance with JIS K6235(2006). Moreover, the "concentration of the group 13 element" referred to in the present disclosure can be measured by ICP atomic emission spectroscopy (ICP-AES).

In the presently disclosed binder composition for an electrochemical device, the concentration of the group 13 element is preferably not less than 1 ppm and not more than 800 ppm. When the concentration of the group 13 element is within the range set forth above, dispersion stability of a conductive carbon material can be further increased, and output characteristics and high-voltage cycle characteristics of an electrochemical device can be further improved.

In the presently disclosed binder composition for an electrochemical device, the group 13 element is preferably aluminum. When aluminum is included as the group 13 element, high-voltage cycle characteristics of an electrochemical device can be further improved.

In the presently disclosed binder composition for an electrochemical device, the iodine value of the polymer is preferably not less than 1 g/100 g and less than 100 g/100 g. When the iodine value of the polymer is within the range set forth above, dispersion stability of a conductive carbon material can be further increased, and output characteristics and high-voltage cycle characteristics of an electrochemical device can be further improved.

Moreover, the present disclosure aims to advantageously solve the problems set forth above, and a presently disclosed conductive material dispersion liquid for an electrochemical device comprises: any one of the binder compositions for an electrochemical device set forth above; a conductive carbon material; and a solvent. Through inclusion of the binder composition for an electrochemical device set forth above in this manner, it is possible to increase dispersion stability of the conductive carbon material while also causing an electrochemical device to display excellent output characteristics and high-voltage cycle characteristics.

In the presently disclosed conductive material dispersion liquid for an electrochemical device, the conductive carbon material is preferably one or more carbon nanotubes. When carbon nanotubes are used as the conductive carbon material, output characteristics of an electrochemical device can be further improved.

Furthermore, the present disclosure aims to advantageously solve the problems set forth above, and a presently disclosed slurry composition for an electrochemical device electrode comprises: an electrode active material; any one of the binder compositions for an electrochemical device set forth above; a conductive carbon material; and a solvent. Through inclusion of the binder composition for an electrochemical device set forth above in this manner, it is possible to increase dispersion stability of the conductive carbon material while also causing an electrochemical device to display excellent output characteristics and high-voltage cycle characteristics.

Also, the present disclosure aims to advantageously solve the problems set forth above, and a presently disclosed electrode for an electrochemical device comprises an electrode mixed material layer formed using the slurry composition for an electrochemical device electrode set forth above. Through the electrode mixed material layer being formed using the slurry composition for an electrochemical device electrode set forth above in this manner, it is possible to cause an electrochemical device to display excellent output characteristics and high-voltage cycle characteristics.

Moreover, the present disclosure aims to advantageously solve the problems set forth above, and a presently disclosed electrochemical device comprises the electrode for an electrochemical device set forth above. Through use of the electrode for an electrochemical device set forth above in this manner, an electrochemical device having excellent output characteristics and high-voltage cycle characteristics is obtained.

Advantageous Effect

According to the present disclosure, it is possible to provide a binder composition for an electrochemical device that can stably disperse a conductive carbon material and that can cause an electrochemical device to display excellent output characteristics and high-voltage cycle characteristics.

Moreover, according to the present disclosure, it is possible to provide a conductive material dispersion liquid for an electrochemical device and a slurry composition for an electrochemical device electrode that have excellent dispersion stability of a conductive carbon material and that can cause an electrochemical device to display excellent output characteristics and high-voltage cycle characteristics.

Furthermore, according to the present disclosure, it is possible to provide an electrode for an electrochemical device that can cause an electrochemical device to display excellent output characteristics and high-voltage cycle characteristics and an electrochemical device that has excellent output characteristics and high-voltage cycle characteristics.

DETAILED DESCRIPTION

The following provides a detailed description of embodiments of the present disclosure.

The presently disclosed binder composition for an electrochemical device contains a polymer and a group 13 element and can be used in production of the presently disclosed conductive material dispersion liquid for an electrochemical device or slurry composition for an electrochemical device electrode. Moreover, the presently disclosed conductive material dispersion liquid for an electrochemical device contains the presently disclosed binder composition for an electrochemical device, a conductive carbon material, and a solvent and can be used in production of the presently disclosed slurry composition for an electrochemical device electrode. Furthermore, the presently disclosed slurry composition for an electrochemical device electrode comprises an electrode active material, the presently disclosed binder composition for an electrochemical device, a conductive carbon material, and a solvent and is used as a material in production of an electrode mixed material layer of an electrode for an electrochemical device. Also, the presently disclosed electrochemical device includes the presently disclosed electrode for an electrochemical device, which is produced using the presently disclosed slurry composition for an electrochemical device electrode.

Note that in the present disclosure, a conductive material dispersion liquid for an electrochemical device is considered to be a dispersion liquid that does not contain an electrode active material.

Binder Composition for Electrochemical Device

Features of the presently disclosed binder composition for an electrochemical device are that it contains a polymer including a nitrile group-containing monomer unit and an alkylene structural unit and a group 13 element and that it satisfies the following relationship formula (1).

$$0.1 \leq M/I \leq 150 \tag{1}$$

(In formula (1), I represents the iodine value (units: g/100 g) of the polymer and M represents the concentration (units: ppm) of the group 13 element.)

It should be noted that besides the components described above, the presently disclosed binder composition for an electrochemical device may further contain components used in the field of electrochemical devices as optional components. Although the presently disclosed binder composition for an electrochemical device may also contain a solvent, it is preferable that the presently disclosed binder composition for an electrochemical device does not substantially contain a solvent. The phrase "does not substantially contain a solvent" means not containing a solvent other than solvent that becomes unavoidably mixed in during a production process of the binder composition for an electrochemical device.

As a result of the presently disclosed binder composition for an electrochemical device containing a polymer that includes a nitrile group-containing monomer unit and an alkylene structural unit, the polymer adsorbs to a conductive carbon material so as to form a protective layer around the conductive carbon material and can stably disperse the conductive carbon material when the presently disclosed binder composition for an electrochemical device is used to produce a conductive material dispersion liquid for an electrochemical device or a slurry composition for an electrochemical device electrode. Moreover, as a result of the presently disclosed binder composition for an electrochemical device containing a group 13 element and as a result of the iodine value of the polymer and the concentration of the group 13 element satisfying the specific relationship set forth above, it is possible to increase dispersion stability of a conductive carbon material while also causing an electrochemical device to display excellent output characteristics and high-voltage cycle characteristics due to metal cross-links being formed to a suitable degree, for example.

Polymer

The polymer contained in the binder composition for an electrochemical device is a component that can disperse a conductive carbon material well in a conductive material dispersion liquid for an electrochemical device or a slurry composition for an electrochemical device electrode that is produced using the binder composition and that, in an electrode including an electrode mixed material layer formed using a slurry composition for an electrode, can hold components contained in the electrode mixed material layer such that these components do not detach from the electrode mixed material layer. The polymer includes a nitrile group-containing monomer unit and an alkylene structural unit and may optionally further include other repeating units. The phrase "includes a monomer unit" means that "a polymer obtained using that monomer includes a structural unit derived from the monomer".

Nitrile Group-Containing Monomer Unit

Examples of nitrile group-containing monomers that can form a nitrile group-containing monomer unit include α,β-ethylenically unsaturated nitrile monomers. Any α,β-ethylenically unsaturated compound that has a nitrile group may be used without any specific limitations as an α,β-ethylenically unsaturated nitrile monomer. Examples thereof include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these monomers, acrylonitrile and methacrylonitrile are preferable, and acrylonitrile is more preferable as a nitrile group-containing monomer.

One of these nitrile group-containing monomers may be used individually, or two or more of these nitrile group-containing monomers may be used in combination.

The proportion constituted by nitrile group-containing monomer units in the polymer when all repeating units in the polymer (total of structural units and monomer units) are taken to be 100 mass % is preferably 10 mass % or more, more preferably 20 mass % or more, and even more preferably 30 mass % or more, and is preferably 50 mass % or less, and more preferably 40 mass % or less. When the proportion constituted by nitrile group-containing monomer units is within any of the ranges set forth above, dispersion stability of a conductive carbon material can be further increased, and elution of the polymer into electrolyte solution inside an electrochemical device can be inhibited.

Alkylene Structural Unit

An alkylene structural unit is a repeating unit that is composed of only an alkylene structure represented by a general formula: —$C_nH_{2n}$— (n is an integer of 2 or more).

Although the alkylene structural unit may be linear or branched, the alkylene structural unit is preferably linear (i.e., is preferably a linear alkylene structural unit). Moreover, the carbon number of the alkylene structural unit is preferably 4 or more (i.e., n in the preceding general formula is preferably an integer of 4 or more).

No specific limitations are placed on the method by which the alkylene structural unit is introduced into the polymer. For example, method (1) or (2) described below may be used.

(1) A method in which a polymer is produced from a monomer composition containing a conjugated diene monomer and then the polymer is hydrogenated in order to convert a conjugated diene monomer unit to an alkylene structural unit (2) A method in which a polymer is produced from a monomer composition containing a 1-olefin monomer (for example, ethylene, propylene, 1-butene, or 1-hexene)

Of these methods, method (1) is preferable in terms of ease of production of the polymer.

The conjugated diene monomer may be a conjugated diene compound having a carbon number of 4 or more such as 1,3-butadiene, isoprene, 2,3-dimethyl-1,3-butadiene, 2-ethyl-1,3-butadiene, or 1,3-pentadiene, for example. Of these conjugated diene compounds, 1,3-butadiene is preferable.

In other words, the alkylene structural unit is preferably a structural unit obtained through hydrogenation of a conjugated diene monomer unit (i.e., the alkylene structural unit is preferably a hydrogenated conjugated diene unit), and is more preferably a structural unit obtained through hydrogenation of a 1,3-butadiene unit (i.e., the alkylene structural unit is more preferably a hydrogenated 1,3-butadiene unit).

One of the conjugated diene monomers or 1-olefin monomers described above may be used individually, or two or more of the conjugated diene monomers or 1-olefin monomers described above may be used in combination.

The proportional content of alkylene structural units in the polymer (total proportional content of alkylene structural units and conjugated diene monomer units in a case in which introduction of an alkylene structural unit is by method (1)) when all repeating units in the polymer (total of structural units and monomer units) are taken to be 100 mass % is preferably 30 mass % or more, more preferably 50 mass % or more, and even more preferably 60 mass % or more, and is preferably 80 mass % or less, more preferably 75 mass % or less, and even more preferably 70 mass % or less. When the proportional content of alkylene structural units in the polymer is within any of the ranges set forth above, the polymer can adsorb well to a conductive carbon material, which makes it possible to increase dispersibility of the conductive carbon material straight after production of a conductive material dispersion liquid or a slurry composition for an electrode (i.e., initial dispersibility).

Other Repeating Units

Examples of monomers (hereinafter, also referred to as "other monomers") that can form other repeating units include, but are not specifically limited to, (meth)acrylic acid ester monomers; aromatic ring-containing monomers such as styrene (St); and polymerizable monomers including a hydrophilic group. Of these examples, (meth)acrylic acid ester monomers are preferable as other monomers.

One of these monomers may be used individually, or two or more of these monomers may be used in combination. In the present disclosure, "(meth)acryl" is used to indicate "acryl" and/or "methacryl".

Examples of (meth)acrylic acid ester monomers include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. Of these examples, ethyl acrylate, n-butyl acrylate, and 2-ethylhexyl acrylate are preferable as (meth)acrylic acid ester monomers, and n-butyl acrylate is more preferable as a (meth)acrylic acid ester monomer.

Examples of polymerizable monomers including a hydrophilic group include carboxy group-containing monomers, sulfo group-containing monomers, phosphate group-containing monomers, and hydroxy group-containing monomers. A carboxy group or a sulfo group is preferable as a hydrophilic group from a viewpoint of increasing binding strength of the polymer, with a carboxy group being more preferable.

Examples of carboxy group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid esters such as methyl allyl maleate, diphenyl maleate, nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Furthermore, an acid anhydride that produces a carboxy group through hydrolysis can also be used as a carboxy group-containing monomer.

Other examples include monoesters and diesters of α,β-ethylenically unsaturated polybasic carboxylic acids such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Examples of sulfo group-containing monomers include vinyl sulfonic acid, methyl vinyl sulfonic acid, (meth)allyl sulfonic acid, styrene sulfonic acid, (meth)acrylic acid 2-sulfoethyl, 2-acrylamido-2-methylpropane sulfonic acid, and 3-allyloxy-2-hydroxypropane sulfonic acid.

In the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

Examples of hydroxy group-containing monomers include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR^1-COO-(C_nH_{2n}O)_m-H$ (where m represents an integer of 2 to 9, n represents an integer of 2 to 4, and $R^1$ represents hydrogen or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; and (meth)allyl thioethers of alkylene glycols such as (meth)allyl-2-hydroxyethyl thioether and (meth)allyl-2-hydroxypropyl thioether.

The proportion constituted by other repeating units in the polymer is preferably 10 mass % or less. When the proportion constituted by other repeating units is 10 mass % or less, plasticity of the polymer can be increased while also inhibiting excessive swelling of the polymer in electrolyte solution and improving life characteristics of an electrochemical device.

Production Method of Polymer

The method by which the polymer described above is produced is not specifically limited and may be solution polymerization, suspension polymerization, bulk polymerization, emulsion polymerization, or the like, for example.

Moreover, the polymerization method may be addition polymerization such as ionic polymerization, radical polymerization, or living radical polymerization. A known polymerization initiator such as a redox polymerization initiator including an iron-based compound may be used as a polymerization initiator.

In a situation in which the polymer is produced by method (1) described above, the method of polymerization of the polymer that is subsequently hydrogenated is preferably radical polymerization using a redox polymerization initiator that includes an iron-based compound. The redox polymerization initiator may be, but is not specifically limited to, a combination of cumene hydroperoxide, ethylenediaminetetraacetic acid iron monosodium salt, sodium hydroxymethanesulfinate, and ethylenediaminetetraacetic acid tetrasodium salt (EDTA·4Na). Moreover, in a situation in which the polymer is produced by method (1) described above, it is also preferable that after emulsion polymerization, a coagulant (for example, aluminum sulfate or boric acid) is used to cause coagulation, and that recovered material is then optionally subjected to "washing" and "dialysis" described below and subsequently hydrogenated.

The hydrogenation may be performed by a known hydrogenation method such as an oil-layer hydrogenation method or a water-layer hydrogenation method. The catalyst used in the hydrogenation may be any selective hydrogenation catalyst that is commonly known such as a palladium-based catalyst or a rhodium-based catalyst. Two or more of such catalysts may be used in combination.

The hydrogenation of the polymer may be carried out, for example, by a method described in JP4509792B2. Specifically, the hydrogenation of the polymer may be performed after subjecting the polymer to metathesis reaction in the presence of a catalyst and a co-olefin.

The washing method of the polymer may, for example, be a method in which deionized water is passed through the recovered polymer so as to perform water washing of the polymer.

Moreover, the dialysis method of the polymer may, for example, be a method in which the recovered polymer is optionally washed and is then loaded into and sealed in a dialysis tube, the sealed dialysis tube is immersed in a vessel containing deionized water, and then deionized water surrounding the dialysis tube in this state is caused to flow to thereby perform dialysis.

Iodine Value

The iodine value of the polymer is preferably 1 g/100 g or more, and is preferably less than 100 g/100 g, more preferably 60 g/100 g or less, and even more preferably 20 g/100 g or less. This is because metal cross-links can be sufficiently formed and dispersion stability of a conductive carbon material can be further increased when the iodine value of the polymer is not less than the lower limit set forth above. This is also because deterioration of high-voltage cycle characteristics of an electrochemical device due to excessive side reactions of unsaturated bonds can be inhibited when the iodine value of the polymer is not more than any of the upper limits set forth above.

Group 13 Element

The group 13 element contained in the binder composition for an electrochemical device may be boron, aluminum, gallium, indium, thallium, or nihonium. Of these group 13 elements, boron and aluminum are preferable from a viewpoint of further improving high-voltage cycle characteristics of an electrochemical device, with aluminum being more preferable.

Note that the group 13 element contained in the binder composition may be one type of element or may be two or more types of elements.

The group 13 element contained in the binder composition for an electrochemical device may originate from a substance (for example, a coagulant) used in production of the polymer or may be introduced by adding a group 13 element-containing compound such as aluminum sulfate, aluminum hydroxide, or boric acid to the binder composition for an electrochemical device.

The concentration of the group 13 element in the binder composition is preferably 1 ppm or more, and is preferably 800 ppm or less, more preferably 150 ppm or less, even more preferably 40 ppm or less, and particularly preferably 30 ppm or less. When the concentration of the group 13 element is not less than the lower limit set forth above, metal cross-links can be sufficiently formed, and dispersion stability of a conductive carbon material can be further increased. Moreover, when the concentration of the group 13 element is not more than any of the upper limits set forth above, deterioration of high-voltage cycle characteristics of an electrochemical device due to side reactions can be inhibited.

Note that the concentration of the group 13 element can be adjusted by adjusting the conditions of washing and/or dialysis of the polymer during production thereof or the amount of a group 13 element-containing compound that is added to the binder composition for an electrochemical device.

Concentration of Group 13 Element/Iodine Value

A ratio (M/I) of the concentration M (units: ppm) of the group 13 element relative to the iodine value I (units: g/100 g) of the polymer is not specifically limited so long as it is not less than 0.1 and not more than 150, but is preferably 0.5 or more, and is preferably 25 or less, and more preferably less than 7. When M/I is not less than any of the lower limits set forth above, a protective layer that is formed around a conductive carbon material by the polymer can be made sufficiently thick, which makes it possible to further improve dispersion stability of the conductive carbon material, and the occurrence of side reactions due to excessive unsaturated bonds can be inhibited, thereby further improving high-voltage cycle characteristics of an electrochemical device. Moreover, when M/I is not more than any of the upper limits set forth above, the thickness of a protective layer formed around a conductive carbon material can be kept to a suitable level, and dispersion stability of the conductive carbon material can be further improved.

Other Components

Besides the components described above, the binder composition may contain components such as reinforcing materials, leveling agents, viscosity modifiers, and additives for electrolyte solution. These components are not specifically limited so long as they do not affect electrochemical reactions, and commonly known examples thereof such as components described in WO2012/115096A1, for example, can be used. One of these components may be used individually, or two or more of these components may be used in combination in a freely selected ratio.

Production of Binder Composition

The binder composition can be produced by, for example, producing the polymer according to the production method of the polymer described above and subsequently removing a solvent that was used in production of the polymer, but is not specifically limited to being produced in this manner. Note that in a case in which a group 13 element-containing compound or any of the other components described above is compounded, mixing thereof may be performed by a known method either before or after removal of the solvent.

Conductive Material Dispersion Liquid For Electrochemical Device

The presently disclosed conductive material dispersion liquid for an electrochemical device contains the presently disclosed binder composition for an electrochemical device set forth above, a conductive carbon material, and a solvent and may optionally further contain other components that are used in the field of electrochemical devices and conductive materials other than the conductive carbon material.

The presently disclosed conductive material dispersion liquid has excellent dispersion stability of the conductive carbon material and can cause an electrochemical device to display excellent output characteristics and high-voltage cycle characteristics as a result of containing the presently disclosed binder composition.

Binder Composition For Electrochemical Device

The binder composition for an electrochemical device can be the binder composition that was described above. The amount of the binder composition for an electrochemical device in terms of solid content per 100 parts by mass of the conductive carbon material is preferably 1 part by mass or more, and more preferably 10 parts by mass or more, and is preferably 50 parts by mass or less, and more preferably 30 parts by mass or less. When the amount of the binder composition is not less than any of the lower limits set forth above, dispersion stability of the conductive carbon material can be further increased. Moreover, when the amount of the binder composition is not more than any of the upper limits set forth above, output characteristics and high-voltage cycle characteristics of an electrochemical device can be further improved.

Conductive Carbon Material

Examples of conductive carbon materials that can function as a conductive material for ensuring electrical contact among an electrode active material in an electrode mixed material layer include carbon black (for example, acetylene black, Ketjenblack® (Ketjenblack is a registered trademark in Japan, other countries, or both), and furnace black), graphite (graphene), carbon fiber (carbon nanofiber), carbon flake, and ultrashort carbon fiber (for example, carbon nanotubes (CNTs) and vapor-grown carbon fiber).

Of these conductive carbon materials, carbon black, carbon fiber (carbon nanofiber), graphite (graphene), and carbon nanotubes (CNTs) are preferable from a viewpoint of electrical conductivity and output characteristics, with acetylene black and carbon nanotubes (CNTs) being more preferable, and carbon nanotubes (CNTs) particularly preferable.

One of these conductive carbon materials may be used individually, or two or more of these conductive carbon materials may be used in combination.

From a viewpoint of further improving output characteristics of an electrochemical device, the specific surface area of the conductive carbon material is preferably 10 $m^2/g$ or more, more preferably 40 $m^2/g$ or more, even more preferably 100 $m^2/g$ or more, and particularly preferably 200 $m^2/g$ or more. Note that the specific surface area of the conductive carbon material is typically 1,500 $m^2/g$ or less.

Also note that the specific surface area of the conductive carbon material referred to in the present disclosure is the nitrogen adsorption specific surface area measured by the BET method and can be measured in accordance with ASTM D3037-81.

Solvent

An organic solvent such as N-methylpyrrolidone (NMP), N,N-dimethylformamide, or acetone, for example, can be used as the solvent. Of these solvents, N-methylpyrrolidone (NMP) is preferable from a viewpoint of solubility of the polymer and dispersion stability of the conductive carbon material.

Other Components

Examples of other components that can be contained in the conductive material dispersion liquid include, but are not specifically limited to, the same components as other components that can be contained in the presently disclosed binder composition. One of these components may be used individually, or two or more of these components may be used in combination in a freely selected ratio.

Other Conductive Materials

Examples of conductive materials other than the conductive carbon material (i.e., other conductive materials) that can be used include, but are not specifically limited to, fibers, foils, and the like of various metals.

Production Method of Conductive Material Dispersion Liquid

The conductive material dispersion liquid can be produced by mixing the components described above by a known mixing method. In particular, from a viewpoint of dispersing the conductive carbon material well, it is preferable that the binder composition and a solvent are mixed to obtain a mixture, and that the conductive carbon material and optionally additional solvent are then added to and mixed with this mixture to thereby produce the conductive material dispersion liquid.

The mixing can be performed using a mixer such as a ball mill, a sand mill, a bead mill, a pigment disperser, a grinding machine, an ultrasonic disperser, a homogenizer, a planetary mixer, or a FILMIX, for example.

Slurry Composition For Electrochemical Device Electrode

The presently disclosed slurry composition for an electrochemical device electrode contains an electrode active material, the presently disclosed binder composition for an electrochemical device set forth above, a conductive carbon material, and a solvent and may optionally further contain an additional binder, other components used in the field of electrochemical devices, conductive materials other than the conductive carbon material, and so forth.

The presently disclosed slurry composition has excellent dispersion stability of the conductive carbon material and can cause an electrochemical device to display excellent output characteristics and high-voltage cycle characteristics as a result of containing the presently disclosed binder composition.

Although the following describes, as one example, a case in which the slurry composition for an electrochemical device electrode is a slurry composition for a lithium ion secondary battery positive electrode, the present disclosure is not limited to the following example.

Electrode Active Material

The electrode active material is a material that gives and receives electrons in an electrode of an electrochemical device. In the case of a positive electrode active material for a lithium ion secondary battery, for example, the positive electrode active material is normally a material that can occlude and release lithium.

Although the following describes, as one example, a positive electrode active material for in the case of an electrochemical device that is a lithium ion secondary battery, the present disclosure is not limited to the following example.

Specific examples of the positive electrode active material for a lithium ion secondary battery include transition metal-containing compounds such as a transition metal oxide, a transition metal sulfide, and a complex metal oxide of lithium and a transition metal. The transition metal may be Ti, V, Cr, Mn, Fe, Co, Ni, Cu, Mo, or the like, for example.

Examples of the transition metal oxide include MnO, $MnO_2$, $V_2O_5$, $V_6O_{13}$, $TiO_2$, $Cu_2V_2O_3$, amorphous $V_2O$—$P_2O_5$, amorphous $MoO_3$, amorphous $V_2O_5$, and amorphous $V_6O_{13}$.

Examples of the transition metal sulfide include $TiS_2$, $TiS_3$, amorphous $MoS_2$, and FeS.

Examples of the complex metal oxide of lithium and a transition metal include a lithium-containing complex metal oxide with a layered structure, a lithium-containing complex metal oxide with a spinel structure, and a lithium-containing complex metal oxide with an olivine structure.

The lithium-containing complex metal oxide with a layered structure may be lithium-containing cobalt oxide (Li-$CoO_2$ (lithium cobalt oxide)), lithium-containing nickel oxide ($LiNiO_2$), a lithium-containing complex oxide of Co—Ni—Mn (Li(Co Mn Ni)$O_2$), a lithium-containing complex oxide of Ni—Mn—Al, a lithium-containing complex oxide of Ni—Co—Al, a solid solution of $LiMaO_2$ and $Li_2MbO_3$, or the like, for example. The lithium-containing complex oxide of Co—Ni—Mn may be Li[$Ni_{0.5}Co_{0.2}Mn_{0.3}$]$O_2$, Li[$Ni_{1/3}Co_{1/3}Mn_{1/3}$]$O_2$, or the like. The solid solution of $LiMaO_2$ and $Li_2MbO_3$ may be $xLiMaO_2 \cdot (1-x)Li_2MbO_3$ or the like, where x represents a number satisfying $0<x<1$, Ma represents one or more types of transition metals having an average oxidation state of 3+, and Mb represents one or more types of transition metals having and average oxidation state of 4+. Examples of solid solutions such as described above include Li[$Ni_{0.17}Li_{0.2}Co_{0.07}Mn_{0.56}$]$O_2$.

The term "average oxidation state" as used herein refers to an average oxidation state of the "one or more types of transition metals" and is calculated from the molar quantities and the valences of the transition metals. For example, in a case in which the "one or more types of transition metals" comprise 50 mol % of $Ni^{2+}$ and 50 mol % of $Mn^{4+}$, the average oxidation state of the "one or more types of transition metals" is $(0.5) \times (2+)+(0.5) \times (4+)=3+$.

The lithium-containing complex metal oxide with a spinel structure may be lithium manganate ($LiMn_2O_4$) or a compound resulting from some of the Mn in lithium manganate ($LiMn_2O_4$) being replaced by another transition metal. One specific example thereof is $Li_s[Mn_{2-t}Mc_t]O_4$ such as $LiNi_{0.5}Mn_{1.5}O_4$, where Mc represents one or more types of transition metals having an average oxidation state of 4+, and specific examples of Mc include Ni, Co, Fe, Cu, and Cr. Moreover, t represents a number satisfying $0<t<1$, and s represents a number satisfying $0 \leq s \leq 1$. It is also possible to use a lithium-rich spinel compound represented by $Li_{1+x}Mn_{2-x}O_4$ ($0<x<2$) as the positive electrode active material.

The lithium-containing complex metal oxide with an olivine structure may be an olivine-type lithium phosphate compound represented by $Li_yMdPO_4$ such as olivine-type lithium iron phosphate ($LiFePO_4$) or olivine-type lithium manganese phosphate ($LiMnPO_4$), where Md represents one or more types of transition metals having an average oxidation state of 3+, examples of which include Mn, Fe, and Co, and y represents a number satisfying $0 \leq y \leq 2$. Md of an olivine-type lithium phosphate compound represented by $Li_yMdPO_4$ may be partly replaced by another metal. Examples of possible replacing metals include Cu, Mg, Zn, V, Ca, Sr, Ba, Ti, Al, Si, B, and Mo.

Of the examples given above, lithium-containing cobalt oxide ($LiCoO_2$), a lithium-containing complex oxide of Co—Ni—Mn (Li(Co Mn Ni)$O_2$), a solid solution of $LiMaO_2$ and $Li_2MbO_3$, Li[$Ni_{0.5}Co_{0.2}Mn_{0.3}$]$O_2$, Li[$Ni_{1/3}Co_{1/3}Mn_{1/3}$]$O_2$, $LiNi_{0.5}Mn_{1.5}O_4$, or the like is preferable as the positive electrode active material from a viewpoint of enabling a higher electrical potential in a lithium ion secondary battery.

Binder Composition For Electrochemical Device

The binder composition for an electrochemical device can be the binder composition that was described above. The amount of the binder composition for an electrochemical device in terms of solid content per 100 parts by mass of the electrode active material is preferably 0.01 parts by mass or more, and more preferably 0.05 parts by mass or more, and is preferably 2 parts by mass or less, and more preferably 1 part by mass or less. When the amount of the binder composition is not less than any of the lower limits set forth above, dispersion stability of the conductive carbon material can be further increased, and an electrode mixed material layer can be formed well. Moreover, when the amount of the binder composition is not more than any of the upper limits set forth above, output characteristics and high-voltage cycle characteristics of an electrochemical device can be further improved.

Conductive Carbon Material

Examples of conductive carbon materials that can be contained in the slurry composition include, but are not specifically limited to, the same conductive carbon materials as those that can be contained in the presently disclosed conductive material dispersion liquid. The amount of the conductive carbon material per 100 parts by mass of the electrode active material is preferably 0.1 parts by mass or more, and more preferably 0.3 parts by mass or more, and is preferably 5 parts by mass or less, and more preferably 3 parts by mass or less. When the amount of the conductive carbon material is not less than any of the lower limits set forth above, output characteristics of an electrochemical device can be further improved. Moreover, when the amount of the conductive carbon material is not more than any of the upper limits set forth above, dispersion stability of the conductive carbon material can be further increased.

Solvent

Examples of solvents that can be contained in the slurry composition include, but are not specifically limited to, the same solvents as those that can be contained in the presently disclosed conductive material dispersion liquid.

Additional Binder

A fluorine-containing polymer such as polyvinylidene fluoride (PVDF), polymethyl methacrylate (PMMA), polyacrylonitrile (PAN), another acrylic copolymer, or the like, for example, may be used as an additional binder. Of these binders, polyvinylidene fluoride (PVDF) and polyacrylonitrile (PAN) are preferable in terms of providing an electrode mixed material layer with excellent peel strength, and polyvinylidene fluoride (PVDF) is more preferable.

The amount of the additional binder among 100 parts by mass, in total, of the polymer contained in the presently disclosed binder composition and the additional binder is preferably 1 part by mass or more, more preferably 3 parts by mass or more, and particularly preferably 5 parts by mass or more, and is preferably 99 parts by mass or less, more preferably 97 parts by mass or less, and particularly preferably 95 parts by mass or less. When the amount of the additional binder is within any of the ranges set forth above, the conductive carbon material can be more stably dispersed, and output characteristics and high-voltage cycle characteristics of an electrochemical device can be further improved.

Other Components

Examples of other components that can be contained in the slurry composition include, but are not specifically limited to, the same other components as those that can be contained in the presently disclosed conductive material dispersion liquid.

Other Conductive Materials

Examples of other conductive materials that can be contained in the slurry composition include, but are not specifically limited to, the same other conductive materials as those that can be contained in the presently disclosed conductive material dispersion liquid.

The slurry composition can be produced by mixing the components described above by a known mixing method. Moreover, the slurry composition can be produced by producing the presently disclosed conductive material dispersion liquid in advance and then adding and mixing the electrode active material with this conductive material dispersion liquid. In particular, from a viewpoint of dispersing the conductive carbon material well, it is preferable that the electrode active material and optional components (additional solvent, additional binder, other components, other conductive materials, etc.) are added to the conductive material dispersion liquid and are mixed therewith to produce the slurry composition.

The mixing can be performed using a mixer such as a ball mill, a sand mill, a bead mill, a pigment disperser, a grinding machine, an ultrasonic disperser, a homogenizer, a planetary mixer, or a FILMIX, for example.

Electrode For Electrochemical Device

The presently disclosed electrode for an electrochemical device may include a current collector and an electrode mixed material layer formed on the current collector, for example, wherein the electrode mixed material layer is formed using the presently disclosed slurry composition for an electrochemical device electrode. In other words, the electrode mixed material layer contains at least a conductive carbon material, an electrode active material, a polymer, and a group 13 element.

It should be noted that components contained in the electrode mixed material layer are components that are contained in the previously described slurry composition. Furthermore, the preferred ratio of these components in the electrode mixed material layer is the same as the preferred ratio of these components in the slurry composition.

As a result of the presently disclosed electrode for an electrochemical device being produced using a slurry composition that contains the presently disclosed binder composition, an electrochemical device having excellent output characteristics and high-voltage cycle characteristics is obtained by using this electrode.

Although the following describes, as one example, a case in which the electrode for an electrochemical device is a positive electrode for a lithium ion secondary battery, the present disclosure is not limited to the following example.

Production Method of Positive Electrode For Secondary Battery

The positive electrode for a secondary battery is produced, for example, through a step of applying the presently disclosed slurry composition set forth above onto the current collector (application step) and a step of drying the slurry composition that has been applied onto the current collector to form a positive electrode mixed material layer on the current collector (drying step).

Note that the positive electrode for a secondary battery can also be produced by a method in which composite particles are prepared through dry granulation of the slurry composition set forth above and are used to form a positive electrode mixed material layer on the current collector.

Application Step

The slurry composition can be applied onto the current collector by any commonly known method without any specific limitations. Specific examples of application methods that can be used include doctor blading, dip coating, reverse roll coating, direct roll coating, gravure coating, extrusion coating, and brush coating. During application, the slurry composition may be applied onto one side or both sides of the current collector. The thickness of the slurry coating on the current collector after application but before drying may be set as appropriate in accordance with the thickness of the positive electrode mixed material layer to be obtained after drying.

The current collector onto which the slurry composition is applied is a material having electrical conductivity and electrochemical durability. Specifically, the current collector may, for example, be made of iron, copper, aluminum, nickel, stainless steel, titanium, tantalum, gold, platinum, or the like. Of these materials, aluminum foil is particularly preferable as a current collector used for a positive electrode. One of these materials may be used individually, or two or more of these materials may be used in combination in a freely selected ratio.

Drying Step

The slurry composition on the current collector may be dried by any commonly known method without any specific limitations. Examples of drying methods that can be used include drying by warm, hot, or low-humidity air; drying in a vacuum; and drying by irradiation with infrared light, electron beams, or the like. Through drying of the slurry composition on the current collector in this manner, a positive electrode mixed material layer is formed on the current collector, thereby providing a positive electrode that includes the current collector and the positive electrode mixed material layer.

After the drying step, the positive electrode mixed material layer may be further subjected to a pressing process such as mold pressing or roll pressing. The pressing process can improve close adherence between the positive electrode mixed material layer and the current collector.

Furthermore, when the positive electrode mixed material layer contains a curable polymer, the polymer is preferably cured after the positive electrode mixed material layer has been formed.

Electrochemical Device

The presently disclosed electrochemical device is an electrochemical device that includes a positive electrode, a negative electrode, an electrolyte solution, and a separator, for example, and in which the presently disclosed electrode for an electrochemical device is used as at least one of the positive electrode and the negative electrode, and preferably as the positive electrode. The presently disclosed electrochemical device has excellent output characteristics and high-voltage cycle characteristics as a result of including the presently disclosed electrode for an electrochemical device.

Although the following describes, as one example, a case in which the electrochemical device is a lithium ion secondary battery, the present disclosure is not limited to the following example.

Electrodes

A commonly known electrode can be used as an electrode other than the presently disclosed electrode. Specifically, a negative electrode formed of a thin sheet of lithium metal or an electrode obtained by forming an electrode mixed material layer on a current collector, for example, can be used as an electrode.

The current collector may be made of a metal material such as iron, copper, aluminum, nickel, stainless steel, titanium, tantalum, gold, or platinum. The electrode mixed material layer can be a layer that contains an electrode active material and a binder. The binder is not specifically limited, and any known material can be used.

Electrolyte Solution

The electrolyte solution is normally an organic electrolyte solution obtained by dissolving a supporting electrolyte in an organic solvent. The supporting electrolyte may, for example, be a lithium salt. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)_2NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of organic solvents that can suitably be used include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having a high permittivity and a wide stable potential region, and a mixture of ethylene carbonate and ethyl methyl carbonate is more preferable.

Note that the concentration of the electrolyte in the electrolyte solution can be adjusted as appropriate and is, for example, preferably 0.5 mass % to 15 mass %, more preferably 2 mass % to 13 mass %, and even more preferably 5 mass % to 10 mass %.

Separator

The separator is not specifically limited, and any of those described in JP2012-204303A, for example, can be used. Of these separators, a microporous membrane made of polyolefinic (polyethylene, polypropylene, polybutene, or polyvinyl chloride) resin is preferred because such a membrane can reduce the total thickness of the separator, which can increase the ratio of electrode active material inside the electrochemical device and increase the volumetric capacity.

The electrochemical device is assembled by, for example, stacking the positive electrode and the negative electrode with the separator in-between, performing rolling, folding, or the like of the resultant laminate, as necessary, in accordance with the electrochemical device shape to place the laminate in a container, injecting the electrolyte solution into the container, and sealing the container. In order to prevent pressure increase inside the electrochemical device and occurrence of overcharging or overdischarging, an overcurrent preventing device such as a fuse or a PTC device; an expanded metal; or a lead plate may be provided as necessary. The shape of the assembled electrochemical device may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

In the examples and comparative examples, the following methods were used to evaluate the concentration of group 13 element in a binder composition, the iodine value of a polymer, the dispersion stability of a conductive carbon material, output characteristics, and high-voltage cycle characteristics.

Concentration of Group 13 Element

Approximately 1 g of a binder composition was sampled and was then incinerated in a 550° C. electric furnace for approximately 3 hours. Thereafter, approximately 5 mL of concentrated sulfuric acid was added, dissolution was caused to occur, and then approximately 5 mL of concentrated nitric acid was gradually added to cause wet decomposition. After decomposition, the acid was diluted and adjusted to a volume of 10 mL with ultrapure water, and then the concentration of group 13 element in the binder composition was measured using an ICP-AES (SPS-5100 produced by SII NanoTechnology Inc.).

Iodine Value

An obtained polymer was vacuum dried at a temperature of 60° C. for 24 hours. The iodine value of the polymer was subsequently measured in accordance with JIS K6235 (2006).

Dispersion Stability

Change in viscosity over time of an obtained conductive material dispersion liquid was evaluated at a temperature of 25° C. using a rheometer (MCR302 produced by Anton Paar).

Specifically, the viscosity of the conductive material dispersion liquid straight after production was taken to be η0, the viscosity of the conductive material dispersion liquid measured in the same way after 7 days of storage was taken to be η7, and the viscosity change rate (=(η7/η0)×100(%)) was determined. Dispersion stability was evaluated by the following standard. A viscosity change rate of closer to 100% indicates better dispersion stability of a conductive carbon material.

A: Viscosity change rate of not less than 100% and less than 125%
B: Viscosity change rate of not less than 125% and less than 150%
C: Viscosity change rate of not less than 150% and less than 175%
D: Viscosity change rate of 175% or more Output Characteristics A produced lithium ion secondary battery was constant-current charged at 0.2 CmA until the battery voltage reached 4.35 V and was then constant-voltage charged at 4.35 V until the charging current reached 0.02 CmA at 25° C. Next, the lithium ion secondary battery was constant-current discharged at 0.2 CmA until the battery voltage reached 3.0 V. The discharge capacity at this time was defined as $C_{0.2}$. Next, the capacity $C_{2.0}$ in discharging at 2 CmA was determined in the same manner with the exception that the discharging was performed at 2 CmA, and then a high-rate discharge characteristic was calculated by the following formula. A higher value for the high-rate discharge characteristic indicates better output characteristics.

High-rate discharge characteristic=$(C_{2.0}/C_{0.2})\times100$(%)
A: High-rate discharge characteristic of 90% or more
B: High-rate discharge characteristic of not less than 85% and less than 90%
C: High-rate discharge characteristic of not less than 80% and less than 85%
D: High-rate discharge characteristic of less than 80%

High-Voltage Cycle Characteristics

A produced lithium ion secondary battery was constant-current charged at 0.5 CmA until the battery voltage reached 4.35 V and was then constant-voltage charged at 4.35 V until the charging current reached 0.02 CmA at 45° C. Next, the lithium ion secondary battery was constant-current discharged at 0.5 CmA until the battery voltage reached 3.0 V. This operation was taken to be 1 cycle and was repeated 100 times. The discharge capacity of the $1^{st}$ cycle was defined as $C_1$, the discharge capacity of the $100^{th}$ cycle was defined as $C_{100}$, and a high-voltage cycle characteristic was evaluated by the following formula.

High-voltage cycle characteristic=$(C_{100}/C_1)\times100$(%)
A: High-voltage cycle characteristic of 90% or more
B: High-voltage cycle characteristic of not less than 85% and less than 90%
C: High-voltage cycle characteristic of not less than 80% and less than 85%
D: High-voltage cycle characteristic of less than 80%

Example 1

Production of Binder Composition

A reactor was charged with 180 parts of deionized water, 25 parts of sodium dodecylbenzenesulfonate aqueous solution (concentration 10%) as an emulsifier, 36 parts of acrylonitrile as a nitrile group-containing monomer, and 0.8 parts of t-dodecyl mercaptan as a molecular weight modifier in this order. Next, gas inside the reactor was purged three times with nitrogen, and then 64 parts of 1,3-butadiene was added as a conjugated diene monomer. The reactor was held at 10° C. while 0.1 parts of cumene hydroperoxide as a polymerization initiator and 0.1 parts of ferrous sulfate were added to initiate a polymerization reaction that was then caused to proceed under stirring.

At the point at which the polymerization conversion rate reached 90%, 0.2 parts of hydroxylamine sulfate was added per 100 parts of monomer to terminate polymerization. Next, residual monomer was removed under reduced pressure at a water temperature of 80° C. to yield a particulate water dispersion of a polymer precursor.

A 10% aqueous solution of aluminum sulfate (coagulant) was added under stirring in an amount such as to be 0.6 parts in terms of solid content relative to 100 parts of the polymer precursor (solid content) in the obtained particulate water dispersion, and the polymer precursor in the water dispersion was caused to coagulate. Thereafter, filtration was performed, and the resultant polymer precursor was water washed by passing 50 equivalents of deionized water relative thereto. Next, 50 g of the obtained polymer precursor was loaded into and sealed inside a cellulose dialysis tube having a pore diameter of 5 nm. The cellulose dialysis tube was then immersed in a vessel containing deionized water, and deionized water surrounding the cellulose dialysis tube was caused to flow while performing dialysis for 48 hours so as to remove residual aluminum sulfate in the obtained polymer precursor.

Next, the polymer precursor was hydrogenated by adopting oil-layer hydrogenation as the hydrogenation method. The polymer precursor was dissolved in acetone such that the concentration thereof was 12% in order to obtain an acetone solution of a hydrogenation subject (polymer precursor). The obtained acetone solution was loaded into an autoclave, 500 mass ppm of a palladium/silica catalyst was added relative to 100 mass % of the hydrogenation subject, and a hydrogenation reaction was performed at a hydrogen pressure of 3.0 MPa for 6 hours to yield a hydrogenation reaction product. Once the hydrogenation reaction had ended, the palladium/silica catalyst was filtered off, and acetone serving as a solvent was removed under reduced pressure to yield a binder composition containing a polymer including a nitrile group-containing monomer unit and an alkylene structural unit.

The concentration of group 13 element in the binder composition and the iodine value of the polymer were measured. The results are shown in Table 1.

Production of Conductive Material Dispersion Liquid

The obtained binder composition was dissolved in N-methylpyrrolidone (NMP) serving as a solvent such as to have a solid content concentration of 8%.

Next, 5.0 parts of carbon nanotubes (CNTs; specific surface area: 230 m$^2$/g) as a conductive carbon material, 1.0 parts (in terms of solid content) of the binder composition, and NMP as a solvent were added together such as to be 100 parts in total, these materials were stirred (3,000 rpm, 10 minutes) using a disper blade, and then 1 hour of dispersing thereof was performed at a circumferential speed of 8 m/s using a bead mill in which zirconia beads of 1 mm in diameter were used so as to produce a conductive material dispersion liquid having a solid content concentration of 6.0%.

The dispersion stability of the obtained conductive material dispersion liquid was evaluated. The result is shown in Table 1.

Production of Slurry Composition For Positive Electrode

A slurry composition for a positive electrode was produced by adding together 97.8 parts of lithium cobalt oxide (LiCo$_2$O$_2$, average particle diameter: 10 μm) as a positive electrode active material, 1.0 parts of polyvinylidene fluoride as a binder, 1.2 parts (in terms of solid content) of the conductive material dispersion liquid, and NMP as a solvent and mixing (60 rpm, 30 minutes) these materials in a planetary mixer. Note that the additive amount of NMP was adjusted such that the viscosity (measured in accordance with JIS Z8803:1991 at temperature of 25° C. and rotation speed of 60 rpm using single cylinder rotational viscometer) of the obtained slurry composition for a positive electrode was within a range of 4,000 mPa·s to 5,000 mPa·s.

Production of Positive Electrode

Aluminum foil of 20 μm in thickness was prepared as a current collector. The slurry composition for a positive electrode was applied onto the aluminum foil by a comma coater such as to have a coating weight after drying of 20 mg/cm$^2$, was dried at 90° C. for 20 minutes and at 120° C. for 20 minutes, and was heat treated at 60° C. for 10 hours to obtain a positive electrode web. This positive electrode web was rolled by roll pressing to produce a sheet-shaped positive electrode including a positive electrode mixed material layer of 3.7 g/cm$^3$ in density and aluminum foil. The thickness of the sheet-shaped positive electrode was 54 μm. This sheet-shaped positive electrode was cut to 4.8 mm in width and 50 cm in length to obtain a positive electrode for a lithium ion secondary battery.

Production of Negative Electrode

A slurry composition for a negative electrode was produced by stirring a mixture of 90 parts of spherical artificial graphite (volume-average particle diameter: 12 μm) and 10 parts of SiO$_x$ (volume-average particle diameter: 10 μm) as a negative electrode active material, 1 part of a styrene-butadiene polymer as a binder, 1 part of carboxymethyl cellulose as a thickener, and an appropriate amount of water as a dispersion medium in a planetary mixer.

Next, copper foil of 15 μm in thickness was prepared as a current collector. The slurry composition for a negative electrode was applied onto both sides of the copper foil such as to have a coating weight after drying of 10 mg/cm$^2$ at each side and was dried at 60° C. for 20 minutes and at 120° C. for 20 minutes. Thereafter, 2 hours of heat treatment was performed at 150° C. to obtain a negative electrode web. This negative electrode web was rolled by roll pressing to produce a sheet-shaped negative electrode including negative electrode mixed material layers (both sides) of 1.8 g/cm$^3$ in density and copper foil. The sheet-shaped negative electrode was cut to 5.0 mm in width and 52 cm in length to obtain a negative electrode for a lithium ion secondary battery.

Preparation of Separator

A separator made of a single layer of polypropylene (produced by Celgard, LLC.; product name: Celgard 2500; thickness: 15 μm) was cut out as 120 cm×5.5 cm.

Production of Secondary Battery

The positive electrode and the negative electrode were wound up with the separator interposed therebetween using a core of 20 mm in diameter so as to obtain a roll. The obtained roll was compressed to a thickness of 4.5 mm from one direction at a rate of 10 mm/s.

In addition, an electrolyte solution (composition: LiPF$_6$ solution of 1.0 M in concentration (solvent: mixed solution in which 5 mass % of fluoroethylene carbonate is added to mixed solvent of ethylene carbonate/ethyl methyl carbonate=3/7 (mass ratio); additive: 2 volume % of vinylene carbonate)) was prepared.

The compressed roll was subsequently housed inside a laminate case made of aluminum together with 3.2 g of the electrolyte solution. A nickel lead was connected to a specific position on the negative electrode, an aluminum lead was connected to a specific position on the positive electrode, and then an opening of the case was heat sealed to obtain a lithium ion secondary battery.

The output characteristics and high-voltage cycle characteristics of the lithium ion secondary battery were evaluated. The results are shown in Table 1.

Example 2

A binder composition, a conductive material dispersion liquid, a slurry composition for a positive electrode, a positive electrode, a negative electrode, a separator, and a lithium ion secondary battery were produced in the same way as in Example 1 with the exception that in production of the binder composition, a 5% aqueous solution of boric acid in an amount such as to be 0.6 parts in terms of solid content was used instead of the 10% aqueous solution of aluminum sulfate (coagulant). Evaluations were conducted in the same manner as in Example 1. The results are shown in Table 1.

Examples 3 to 5

A binder composition, a conductive material dispersion liquid, a slurry composition for a positive electrode, a positive electrode, a negative electrode, a separator, and a lithium ion secondary battery were produced in the same way as in Example 1 with the exception that in production of the binder composition, the dialysis time was changed to 24 hours (Example 3), 20 hours (Example 4), or 10 hours (Example 5). Evaluations were conducted in the same manner as in Example 1. The results are shown in Table 1.

Example 6

A binder composition, a conductive material dispersion liquid, a slurry composition for a positive electrode, a positive electrode, a negative electrode, a separator, and a lithium ion secondary battery were produced in the same way as in Example 1 with the exception that in production of the binder composition, dialysis was not performed, and the amount of palladium/silica catalyst in the hydrogenation reaction was changed to 200 mass ppm. Evaluations were conducted in the same manner as in Example 1. The results are shown in Table 1.

Example 7

A binder composition, a conductive material dispersion liquid, a slurry composition for a positive electrode, a positive electrode, a negative electrode, a separator, and a lithium ion secondary battery were produced in the same way as in Example 1 with the exception that dialysis was not performed in production of the binder composition. Evaluations were conducted in the same manner as in Example 1. The results are shown in Table 1.

Example 8

A binder composition, a conductive material dispersion liquid, a slurry composition for a positive electrode, a positive electrode, a negative electrode, a separator, and a lithium ion secondary battery were produced in the same way as in Example 6 with the exception that in production of the binder composition, the used amount of the 10% aqueous solution of aluminum sulfate (coagulant) was changed from 0.6 parts to 1.0 parts. Evaluations were conducted in the same manner as in Example 1. The results are shown in Table 1.

Example 9

A binder composition, a conductive material dispersion liquid, a slurry composition for a positive electrode, a positive electrode, a negative electrode, a separator, and a lithium ion secondary battery were produced in the same way as in Example 1 with the exception that in production of the binder composition, the amount of acrylonitrile was changed to 28 parts and the amount of 1,3-butadiene was changed to 72 parts. Evaluations were conducted in the same manner as in Example 1. The results are shown in Table 1.

Example 10

A binder composition, a conductive material dispersion liquid, a slurry composition for a positive electrode, a positive electrode, a negative electrode, a separator, and a lithium ion secondary battery were produced in the same way as in Example 1 with the exception that 10 in production of the binder composition, the amount of acrylonitrile was changed to 44 parts and the amount of 1,3-butadiene was changed to 56 parts. Evaluations were conducted in the same manner as in Example 1. The results are shown in Table 1.

Example 11

A binder composition, a conductive material dispersion liquid, a slurry composition for a positive electrode, a positive electrode, a negative electrode, a separator, and a lithium ion secondary battery were produced in the same way as in Example 1 with the exception that in production of the binder composition, the amount of acrylonitrile was changed to 18 parts, the amount of 1,3-butadiene was changed to 47 parts, and 35 parts of butyl acrylate was also used. Evaluations were conducted in the same manner as in Example 1. The results are shown in Table 1.

Example 12

A binder composition, a conductive material dispersion liquid, a slurry composition for a positive electrode, a positive electrode, a negative electrode, a separator, and a lithium ion secondary battery were produced in the same way as in Example 1 with the exception that acetylene black (specific surface area: 130 m$^2$/g) was used instead of carbon nanotubes as a conductive carbon material. Evaluations were conducted in the same manner as in Example 1. The results are shown in Table 1.

Comparative Example 1

A binder composition, a conductive material dispersion liquid, a slurry composition for a positive electrode, a positive electrode, a negative electrode, a separator, and a lithium ion secondary battery were produced in the same way as in Example 1 with the exception that in production of the binder composition, a 10% aqueous solution of calcium chloride in an amount such as to be 1.0 parts in terms of solid content was used instead of the 10% aqueous solution of aluminum sulfate (coagulant). Evaluations were conducted in the same manner as in Example 1. Moreover, the concentration of calcium element in the binder composition was measured in the same way as the concentration of group 13 element. The results are shown in Table 1.

Comparative Example 2

A binder composition, a conductive material dispersion liquid, a slurry composition for a positive electrode, a positive electrode, a negative electrode, a separator, and a lithium ion secondary battery were produced in the same way as in Example 1 with the exception that in production of the binder composition, the used amount of the 10% aqueous solution of aluminum sulfate (coagulant) was changed from 0.6 parts to 1.0 parts. Evaluations were conducted in the same manner as in Example 1. The results are shown in Table 1.

Comparative Example 3

A binder composition, a conductive material dispersion liquid, a slurry composition for a positive electrode, a positive electrode, a negative electrode, a separator, and a lithium ion secondary battery were produced in the same way as in Example 1 with the exception that in production of the binder composition, the amount of palladium/silica catalyst in the hydrogenation reaction was changed to 200 mass ppm. Evaluations were conducted in the same manner as in Example 1. The results are shown in Table 1.

TABLE 1

| | | | | | Example 1 | Example 2 | Example 3 | Example 4 | Example 5 | Example 6 | Example 7 | Example 8 |
|---|---|---|---|---|---|---|---|---|---|---|---|---|
| Slurry composition for positive electrode | Positive electrode active material (LiCo$_2$O$_2$) [parts by mass] | | | | 97.8 | 97.8 | 97.8 | 97.8 | 97.8 | 97.8 | 97.8 | 97.8 |
| | Binder (PVDF) [parts by mass] | | | | 1 | 1 | 1 | 1 | 1 | 1 | 1 | 1 |
| | Conductive material dispersion liquid | Conductive carbon material | Carbon nanotubes [parts by mass] | | 5 | 5 | 5 | 5 | 5 | 5 | 5 | 5 |
| | | | Acetylene black [parts by mass] | | — | — | — | — | — | — | — | — |
| | | Binder composition | Polymer | Chemical composition | | | | | | | | |
| | | | | Acrylonitrile unit [mass %] | 36 | 36 | 36 | 36 | 36 | 36 | 36 | 36 |
| | | | | 1,3-Butadiene unit + Hydrogenated 1,3-butadiene unit [mass %] | 64 | 64 | 64 | 64 | 64 | 64 | 64 | 64 |
| | | | | Butyl-acrylate unit [mass %] | — | — | — | — | — | — | — | — |
| | | | Iodine value [g/100 g] | | 6.2 | 6.2 | 6.2 | 6.2 | 6.2 | 58 | 6.2 | 58 |
| | | | Aluminum [ppm] | | 4.9 | — | 25 | 38 | 124 | 700 | 700 | 1000 |
| | | | Boron [ppm] | | — | 5.2 | — | — | — | — | — | — |
| | | | Calcium [ppm] | | — | — | — | — | — | — | — | — |
| | | | M/I (metal element concentration/iodine value) [-] | | 0.79 | 0.84 | 4.03 | 6.13 | 20 | 12.07 | 112.90 | 17.24 |
| | | | Amount [parts by mass] | | 1 | 1 | 1 | 1 | 1 | 1 | 1 | 1 |
| | | Amount [parts by mass] | | | 1.2 | 1.2 | 1.2 | 1.2 | 1.2 | 1.2 | 1.2 | 1.2 |
| Evaluation | Dispersion stability | | | | A | A | A | A | B | B | C | B |
| | Output characteristics | | | | A | A | A | A | B | B | C | B |
| | High-voltage cycle characteristics | | | | A | B | A | B | B | C | C | C |

| | | | | | Example 9 | Example 10 | Example 11 | Example 12 | Comparative Example 1 | Comparative Example 2 | Comparative Example 3 |
|---|---|---|---|---|---|---|---|---|---|---|---|
| Slurry composition for positive electrode | Positive electrode active material (LiCo$_2$O$_2$) [parts by mass] | | | | 97.8 | 97.8 | 97.8 | 97.8 | 97.8 | 97.8 | 97.8 |
| | Binder (PVDF) [parts by mass] | | | | 1 | 1 | 1 | 1 | 1 | 1 | 1 |
| | Conductive material dispersion liquid | Conductive carbon material | Carbon nanotubes [parts by mass] | | 5 | 5 | 5 | — | 5 | 5 | 5 |
| | | | Acetylene black [parts by mass] | | — | — | — | 5 | — | — | — |
| | | Binder composition | Polymer | Chemical composition | | | | | | | |
| | | | | Acrylonitrile unit [mass %] | 28 | 44 | 18 | 36 | 36 | 36 | 36 |
| | | | | 1,3-Butadiene unit + Hydrogenated 1,3-butadiene unit [mass %] | 72 | 56 | 47 | 64 | 64 | 64 | 64 |

TABLE 1-continued

|  |  |  |  |  |  |  |  |  |
|---|---|---|---|---|---|---|---|---|
|  | Butyl-acrylate unit [mass %] | — | — | 35 | — | — | — | — |
|  | Iodine value [g/100 g] | 6.2 | 6.2 | 13.2 | 6.2 | 6.2 | 6.2 | 58 |
|  | Aluminum [ppm] | 4.8 | 5.2 | 5.1 | 4.7 | — | 1000 | 4.9 |
|  | Boron [ppm] | — | — | — | — | — | — | — |
|  | Calcium [ppm] | — | — | — | — | 220 | — | — |
|  | M/I (metal element concentration/ iodine value) [-] | 0.77 | 0.84 | 0.39 | 0.76 | 35.48 | 161.3 | 0.084 |
|  | Amount [parts by mass] | 1 | 1 | 1 | 1 | 1 | 1 | 1 |
|  | Amount [parts by mass] | 1.2 | 1.2 | 1.2 | 1.2 | 1.2 | 1.2 | 1.2 |
| Evaluation | Dispersion stability | A | A | C | A | B | D | D |
|  | Output characteristics | A | A | C | B | B | D | D |
|  | High-voltage cycle characteristics | A | A | B | A | D | C | C |

It can be seen from Table 1 that a conductive carbon material could be stably dispersed and an electrochemical device having excellent output characteristics and high-voltage cycle characteristics was obtained in Examples 1 to 12.

It can also be seen from Table 1 that high-voltage cycle characteristics of an electrochemical device deteriorated in Comparative Example 1 in which a group 13 element was not included, and that dispersion stability of a conductive carbon material decreased and output characteristics of an electrochemical device deteriorated in Comparative Examples 2 and 3 in which the iodine value of a polymer and the concentration of group 13 element did not satisfy a specific relationship.

INDUSTRIAL APPLICABILITY

According to the present disclosure, it is possible to provide a binder composition for an electrochemical device that can stably disperse a conductive carbon material and that can cause an electrochemical device to display excellent output characteristics and high-voltage cycle characteristics.

Moreover, according to the present disclosure, it is possible to provide a conductive material dispersion liquid for an electrochemical device and a slurry composition for an electrochemical device electrode that have excellent dispersion stability of a conductive carbon material and that can cause an electrochemical device to display excellent output characteristics and high-voltage cycle characteristics.

Furthermore, according to the present disclosure, it is possible to provide an electrode for an electrochemical device that can cause an electrochemical device to display excellent output characteristics and high-voltage cycle characteristics and an electrochemical device that has excellent output characteristics and high-voltage cycle characteristics.

The invention claimed is:

1. A binder composition for an electrochemical device comprising: a polymer including a nitrile group-containing monomer unit and an alkylene structural unit; and a group 13 element, wherein
   the group 13 element is aluminum,
      the concentration of the group 13 element is not less than 1 ppm and not more than 40 ppm, and
   when an iodine value of the polymer is taken to be I, in units of g/100 g, and concentration of the group 13 element is taken to be M, in units of ppm, a relationship formula:

$0.1 \leq M/I \leq 150$ is satisfied.

2. The binder composition for an electrochemical device according to claim 1, wherein the iodine value of the polymer is not less than 1 g/100 g and less than 100 g/100 g.

3. A conductive material dispersion liquid for an electrochemical device comprising: the binder composition for an electrochemical device according to claim 1; a conductive carbon material; and a solvent.

4. The conductive material dispersion liquid for an electrochemical device according to claim 3, wherein the conductive carbon material is one or more carbon nanotubes.

5. A slurry composition for an electrochemical device electrode comprising: an electrode active material; the binder composition for an electrochemical device according to claim 1; a conductive carbon material; and a solvent.

6. An electrode for an electrochemical device comprising an electrode mixed material layer formed using the slurry composition for an electrochemical device electrode according to claim 5.

7. An electrochemical device comprising the electrode for an electrochemical device according to claim 6.

* * * * *